(12) United States Patent
Tyson

(10) Patent No.: US 12,300,090 B2
(45) Date of Patent: May 13, 2025

(54) ALARM AND FIRST RESPONDER SYSTEMS, METHODS, AND DEVICES

(71) Applicant: David G. Tyson, Atlanta, GA (US)

(72) Inventor: David G. Tyson, Atlanta, GA (US)

(73) Assignee: David G. Tyson, Atlanta, GA (US)

( * ) Notice: Subject to any disclaimer, the term of this patent is extended or adjusted under 35 U.S.C. 154(b) by 0 days.

(21) Appl. No.: 17/952,489

(22) Filed: Sep. 26, 2022

(65) Prior Publication Data

US 2023/0020380 A1 Jan. 19, 2023

Related U.S. Application Data

(63) Continuation of application No. 16/871,745, filed on May 11, 2020, now Pat. No. 11,455,881.

(60) Provisional application No. 62/845,975, filed on May 10, 2019.

(51) Int. Cl.

| | |
|---|---|
| *H04W 4/38* | (2018.01) |
| *G08B 17/12* | (2006.01) |
| *G08B 29/04* | (2006.01) |
| *H04B 17/318* | (2015.01) |
| *H04W 4/33* | (2018.01) |
| *H04W 4/90* | (2018.01) |

(52) U.S. Cl.
CPC ......... *G08B 29/043* (2013.01); *G08B 17/125* (2013.01); *H04B 17/318* (2015.01); *H04W 4/33* (2018.02); *H04W 4/38* (2018.02); *H04W 4/90* (2018.02)

(58) Field of Classification Search
CPC ........ G08B 29/02; G08B 29/043; H04W 4/38
See application file for complete search history.

(56) References Cited

U.S. PATENT DOCUMENTS

| | | | | |
|---|---|---|---|---|
| 10,282,957 | B1 * | 5/2019 | Kirkbride | ............. G01J 5/0066 |
| 2010/0141435 | A1 | 6/2010 | Breed | |
| 2010/0188212 | A1 * | 7/2010 | Jochelson | ................ H04R 5/04 |
| | | | | 381/26 |
| 2011/0291843 | A1 | 12/2011 | Andersen | |
| 2015/0096352 | A1 | 4/2015 | Peterson et al. | |
| 2015/0097663 | A1 * | 4/2015 | Sloo | ..................... G01N 33/004 |
| | | | | 340/501 |
| 2015/0339915 | A1 * | 11/2015 | Waterman | ............. G08B 17/00 |
| | | | | 340/693.1 |
| 2019/0035251 | A1 | 1/2019 | Lim | |
| 2019/0318611 | A1 * | 10/2019 | Gravel | ................... H04W 4/026 |
| 2020/0117900 | A1 * | 4/2020 | Deng | ........................ G06F 1/163 |
| 2020/0402378 | A1 * | 12/2020 | Connell, II | ............. G08B 17/00 |
| 2021/0360070 | A1 * | 11/2021 | Cella | ..................... H04L 67/565 |

\* cited by examiner

*Primary Examiner* — Benyam Haile
(74) *Attorney, Agent, or Firm* — TROUTMAN PEPPER LOCKE LLP; Dustin B. Weeks; Stephanie J. Remy

(57) ABSTRACT

An emergency sensor system comprising: a plurality of environmental sensors; a local monitoring station (LMS) connected to each of the plurality of environmental sensors, the LMS comprising a transceiver, a processor, and a memory having stored thereon instructions that, when executed by the processor, control the processor to execute a method comprising: receiving, from at least one of the plurality of environmental sensors, sensor data indicative of an environmental state proximate the at least one environmental sensor, analyze the sensor data, and output, to a remote responder system, an alert based on the sensor data.

17 Claims, 6 Drawing Sheets

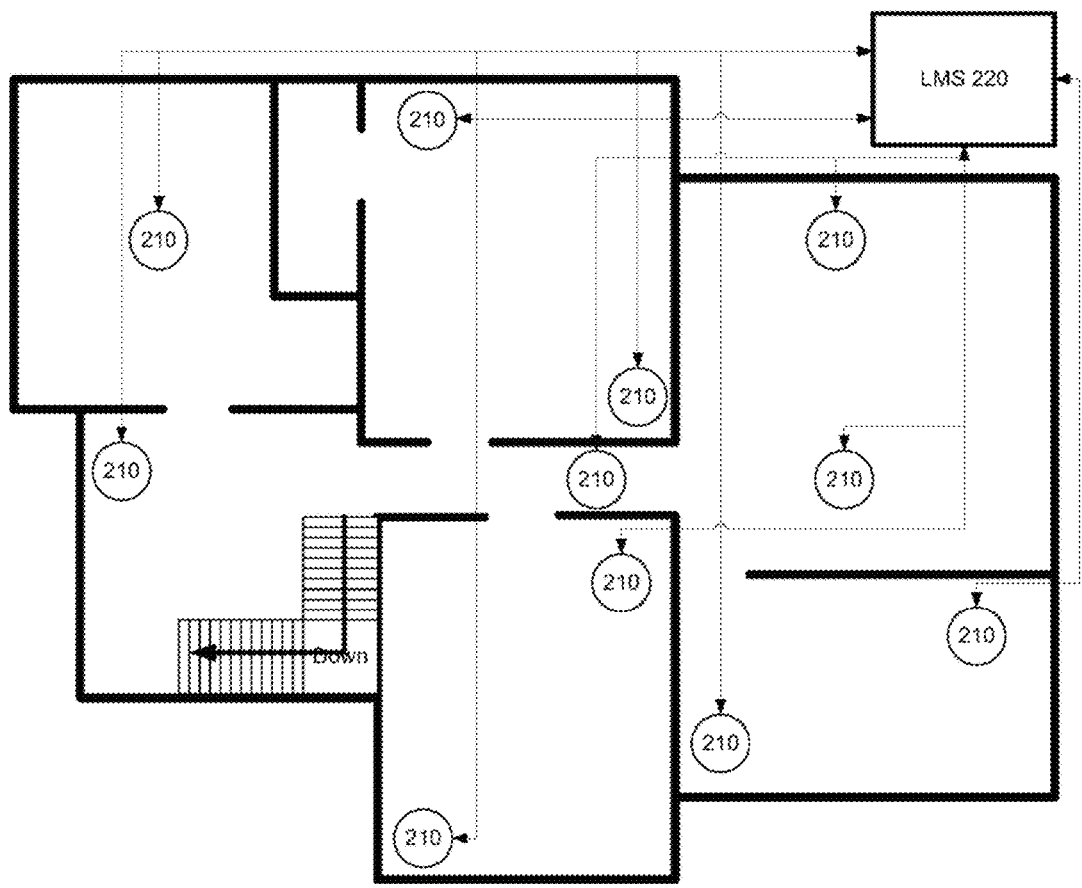

ALARM AND FIRST RESPONDER SYSTEMS, METHODS, AND DEVICES

CROSS-REFERENCE TO RELATED APPLICATIONS

This application claims the benefit of U.S. Non-Provisional application Ser. No. 16/871,745 filed May 11, 2020, which claims the benefit of U.S. Provisional Application No. 62/845,975 filed May 10, 2019, the entirety of which is incorporated by reference as if set forth in full below.

FIELD

This application generally relates to the alarm systems, methods, and devices, and, more particularly, to improvements to alarm systems for mapping and relaying real-time events, e.g., by transmitting real-time data from each sensor to mainframe controller.

BACKGROUND

National and local safety codes and regulations require public buildings, such as apartments and office buildings, to be provided with alarm systems (e.g., fire or smoke alarms) to alert occupants of certain dangers. In the related art, passive detection components are distributed around a building, and relate a signal to a single local control panel. The local control panel then sends a simple alert signal (i.e., merely an indication that there is an emergency) triggering emergency responders. Since these related systems include minimal if any intelligence, emergency responders must physically visit the site to determine whether the event is real or a false alarm, as well as the nature of the emergency, and the emergency location. This current model and method are very inefficient and ineffective.

For example, if a thermocouple sensor detects a temperature above a particular threshold, the thermocouple generates a signal to a local control panel indicating a sensor has detected excess heat. The local control panel then sends an alert to an emergency dispatch center, which dispatches firetruck(s), police, and ambulance(s) to the building. However, the signal does not provide information indicative of the temperature detected, nor the location within the building of the sensor, nor whether multiple sensors within the building have detected similar events, etc. Thus, emergency response personnel must attempt to ascertain this information manually upon arrival at the building, which delays response time and places everyone involved in danger Thus, certain related art systems waste significant resources and valuable time in responding to emergencies, whether true or false. Moreover, without real-time mapping of emergency events, danger to property and individuals is increased because much of the response is driven by guesswork.

Accordingly, what is needed are improved alarm system, methods, and devices. Aspects of the present disclosure address these and other issues.

SUMMARY

According to some embodiments, there is provided a monitoring station (e.g., a local monitoring station or (LMS)) connectable to each of a plurality of environmental sensors, the LMS including a transceiver, a processor, and a memory having stored thereon instructions that, when executed by the processor, control the processor to execute a method including: receiving, from at least one environmental sensor of the plurality of environmental sensors, sensor data indicative of an environmental state proximate the at least one environmental sensor, analyze the sensor data, and output, to a remote responder system, an alert based on the sensor data.

The LMS may be configured to provide auxiliary power to the plurality of environmental systems through physical connections between the LMS and the plurality of environmental systems.

The LMS may be further configured to: monitor use of the auxiliary power by the plurality of environmental sensors; and output, in response to determining use of the auxiliary power by one or more environmental sensors of the plurality of environmental sensors, an alert indicating that a main power source of the one or more environmental sensors is unavailable.

The physical connections may include a power line connection, and the LMS is configured to receive the sensor data utilizing a data-over-power protocol.

The LMS may further include a battery, and the LMS is further configured to provide the auxiliary power to the plurality of environmental sensors through the battery.

The sensor data may include location information of the at least one environmental sensor.

The instructions, when executed by the processor, may further control the processor to generate a real-time event map based on the environmental state and the location information.

The plurality of environmental sensors are installed in a building, and the real-time event map includes overlaying a floorplan of the building with environmental states indicated by the at least one environmental sensor and at locations corresponding to the location information.

One or more of the plurality of environmental sensors may include a respective camera, and the real-time event map may include one or more images captured by one or more respective cameras of the at least one environmental sensor.

One or more of the plurality of environmental sensors may include a respective camera activatable by a signal from the LMS.

The instructions, when executed by the processor, further control the processor to activate one or more respective cameras of the at least one environmental sensor in response to determining, based on the sensor data, that an emergency situation is occurring.

The cameras may only be activatable by a signal from the LMS.

The sensor data may indicate at least one from among a temperature, a fire intensity, and a parts-per-million (PPM) of smoke-particles.

The plurality of environmental sensors may be configured to automate location information.

The plurality of environmental sensors may be configured to automate location information by wireless communicating relative positions of the environmental sensors to estimate respective locations of the environmental sensors.

The plurality of environmental sensors may be further configured to output wireless directional signals and estimate respective locations of the smart sensors based on a direction and signal strength of the outputted wireless directional signals.

According to an embodiment there is provided an emergency sensor system including an LMS and the plurality of environmental sensors.

According to an embodiment, there may be an emergency sensor system including: a plurality of smart sensors installable at positions about a building, each of the plurality of smart sensors including: an environmental sensor configured to monitor one or more local conditions; and a transceiver. The plurality of smart sensors may include one or more edge sensors and one or more central sensors. The central sensors may be configured to transmit, using the transceiver, sensor data to one or more of the one or more edge sensors. The one or more edge sensors may be configured to forward the sensor data to a remote monitoring station (RMS).

The plurality of smart sensors may be configured to form a mesh network and transmit sensor data to the edge sensors over the mesh network.

The sensor data may further include location information of the respective smart sensor.

The RMS may be configured to generate a real-time event map based on the local conditions and the location information.

BRIEF DESCRIPTION OF THE DRAWINGS

The accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIG. 2 is a diagram of an emergency sensor system according to an example embodiment;

DETAILED DESCRIPTION

Figure 1:
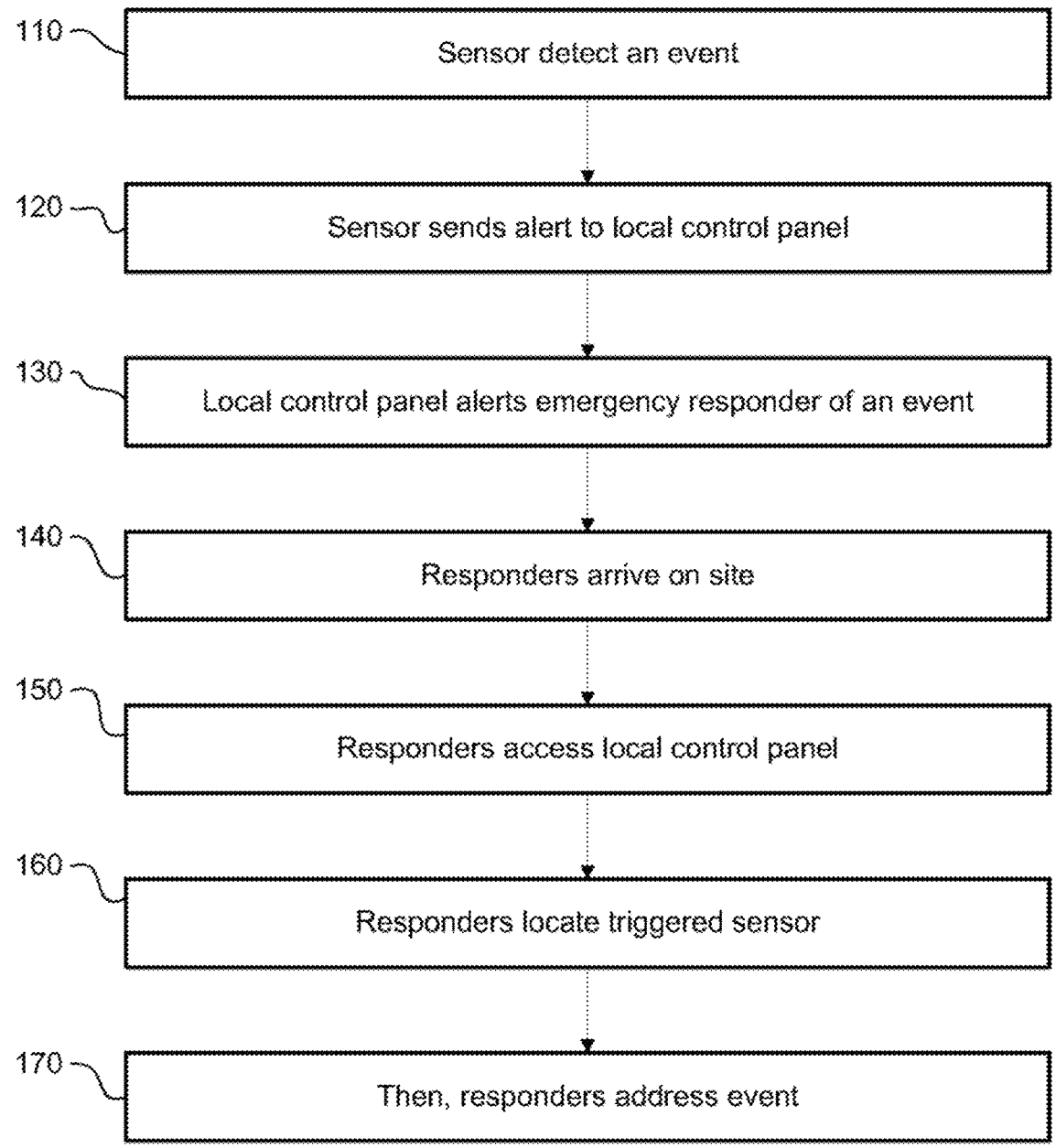
FIG. 1 is a flow diagram of an emergency alert flow a monitoring system in the related art.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out aspects of the invention. As various changes could be made in the above constructions without departing from the scope of the disclosure, it is intended that all matter contained herein or shown in the accompanying drawings shall be interpreted as illustrative and not in a limiting sense.

Certain embodiments of the present disclosure includes systems for monitoring the presence of events in a building and transmitting this information to a remote emergency dispatch center. The system may include a plurality of smart sensors located at predetermined locations within a building. The sensors monitor one or more conditions, such as temperature, smoke, noise, air quality, and the like. The sensors may also capture and/or record sound or video. The smart sensors may transmit information associated with monitored condition(s) (e.g., temperature, $CO_2$ level). In addition, the smart sensor may transmit an indication of a location of the sensor (e.g., location description, sensor identifier (ID), floor number, or the like). In some cases, the smart sensors may transmit this information to a local monitoring station (e.g., a central workstation located at or near the building), which is in communication with each of the plurality of smart sensors. When an event is detected, the smart sensors may monitor (e.g., continuously or repeatedly) the conditions and update the local monitoring station as to any changes to the conditions. The local monitoring station may analyze data from the plurality of smart sensors to determine event location, status, and type. For example, by continuously monitoring a plurality of smart sensors, the local monitoring station may detect a fire and determine the fire's location, intensity (e.g., temperature), and movement direction. With this information, emergency response personnel may be better equipped to respond to the event.

In some embodiments, the local monitoring station may compile the information, and compose, in real-time, a map (e.g., a 3-D) of the event based on the sensor data. The real-time 3D image can be transmitted to first responders (e.g., to a remote monitoring station ("RMS") or via a tablet or other internet-connected device). Additionally, by monitoring the plurality of smart sensors, the local monitoring station may determine false alarms, and turn off system responses (e.g., sprinklers). For example, if a heat detector is triggered by an impact, it may still transmit expected (room) temperature readings. Further, additional heat detector(s) near the impacted heat detector may continue indicating standard temperatures. Alternatively, in some cases, triggering the heat detector may automatically turn on a camera, which can capture images of the area near the heat detector. By analyzing data from one or more of the impacted heat sensor, the nearby other heat detectors, and/or image data from the camera, the local monitoring system may determine that the event is a false alarm.

In certain implementations, each smart sensor may be connected to the local monitoring system through a combination power-data line. Accordingly, unlike in related art systems where each smart sensor requires its own backup battery, a universal backup battery may be centrally located at the local monitoring system, which may provide power to any of the sensors as needed. Furthermore, the local monitoring system may track power sent from the battery to identify sensors without standard power, and trigger an alert to perform sensor maintenance. Likewise, if a smart sensor unexpectedly ceases sending data to the local monitoring system (e.g., an update of the condition status every 30 seconds) or the condition readings become unintelligible (e.g., a heat detector not being triggered at very high heat), the local monitoring system may send an alert for sensor maintenance.

Although a local monitoring station is generally described as receiving all sensor data, this is merely an example. In some cases, the sensors may individually include transceivers. In some cases, the sensors may form a mesh network, and may transmit their information to edge sensors (e.g., sensors nearest a window or whose transceivers otherwise have a best data connection), and may transmit their information to a remote monitoring station.

According to some embodiments, the smart sensors may automate location setting. For example, a plurality sensors may communicate with each other to triangulate their respective locations within a building. For instance, if a first sensor is known to be on a northeast corner of a given floor of the building, adjacent sensors may determine their locations based on, for example, signal strength and direction. In some cases, the sensors may output directional signals (e.g., coordinated directional signals), such that each sensor may more accurately determine its relative location to the remaining sensors.

Reference will now be made the figures in which aspects of the present disclosure are illustrated.

FIG. 1 is a flow diagram 100 of an emergency alert flow a monitoring system in the related art. In FIG. 1, a plurality of sensors are distributed across a building. Each sensor is connected to a local control panel in the building. When a sensor detects 110 an event (e.g., smoke), it sends 1120 a signal to the local control panel. The local control panel then alerts 130 emergency responders that an event has occurred in the building. However, the sensors and local control panel are unable to determine or relay the type of event, where the event occurred, a size of the event (e.g., whether multiple sensors were triggered, or a current status of the event. Responders, therefore, must arrive 140 onsite, access 150 the local control panel, find 160 the triggered sensor, and 170 address the event.

FIG. 2 is a diagram 200 of an emergency sensor system installed in a building according to an example embodiment. FIG. 2 illustrates the system including a plurality of smart sensors 210 distributed in various rooms on a floor of the building. One of ordinary skill will recognize that additional floors may have one or more smart sensors 210 distributed therein, either in similar or different configurations. Each of the smart sensors 210 is connected to a local monitoring station ("LMS") 220. In some cases, the connection may be a bi-directional information channel. In some cases, the connection may by two-wire ethernet, DSL, and/or a wireless connection.

In the related art, individual sensors require individual battery packs for backup. When a sensor loses main power, the battery is used and drained. Until the battery gets low, there is no indication that the sensor does not have a primary battery source. In contrast, in some implementations, the connection to LMS 220 may be configured to provide backup power to smart sensors 210. When smart sensor 210 requires backup power, LMS 220 may provide the same from a central battery backup and/or an alternative main power source (e.g., LMS 220's main power source). LMS 220 may monitor power consumption of the smart sensors 210 to determine when the sensors 210's main power source is unavailable and output an alert for sensor maintenance.

Smart sensors 210 may detect one or more conditions, and update LMS 220 of the condition status. The update may include, sensor information and/or ranges (e.g., indicating a temperature. Fire intensity, smoke particles per million), and may include either location (e.g., floor, room and/or location reference) or a sensor ID (e.g., if LMS 220 know the location). For example, smart sensors 210 may detect fire, smoke, carbon monoxide, motion, temperature, carbon dioxide, light, and/or humidity.

When an alert is triggered by one or more smart sensors 210, LMS 220 may analyze the sensor data and location information to map out the event in real-time. For example, LMS 220 may generate a real-time event map, such as by overlaying the sensor data (or representations of the sensor data) on a floorplan. In some cases, smart sensors 210 may include a camera and/or microphone. Images and/or sounds from the sensors may be included in the real-time event map. In some cases, the camera and/or microphone may only be activated by a signal from LMS 220.

In some cases, a building may be retrofitted to include one or more smart sensors 210 and LMS 220. For example, in some cases, a building may have traditional sensors that draw power using traditional power lines (e.g., copper wires). The traditional sensors may be replaced with smart sensors 210 and the local control panel may be replaced with LMS 220. The smart sensors 210 may connect to LMS 220 through the power lines. LMS 220 may provide power to the smart sensors 210 through the power lines and/or communicate with the smart sensors 210 via ethernet-over-power. In some cases, DSL lines may run to the traditional sensors, and the smart sensors 210 may communicate with LMS 220 through a DSL connection.

Figure 3A:
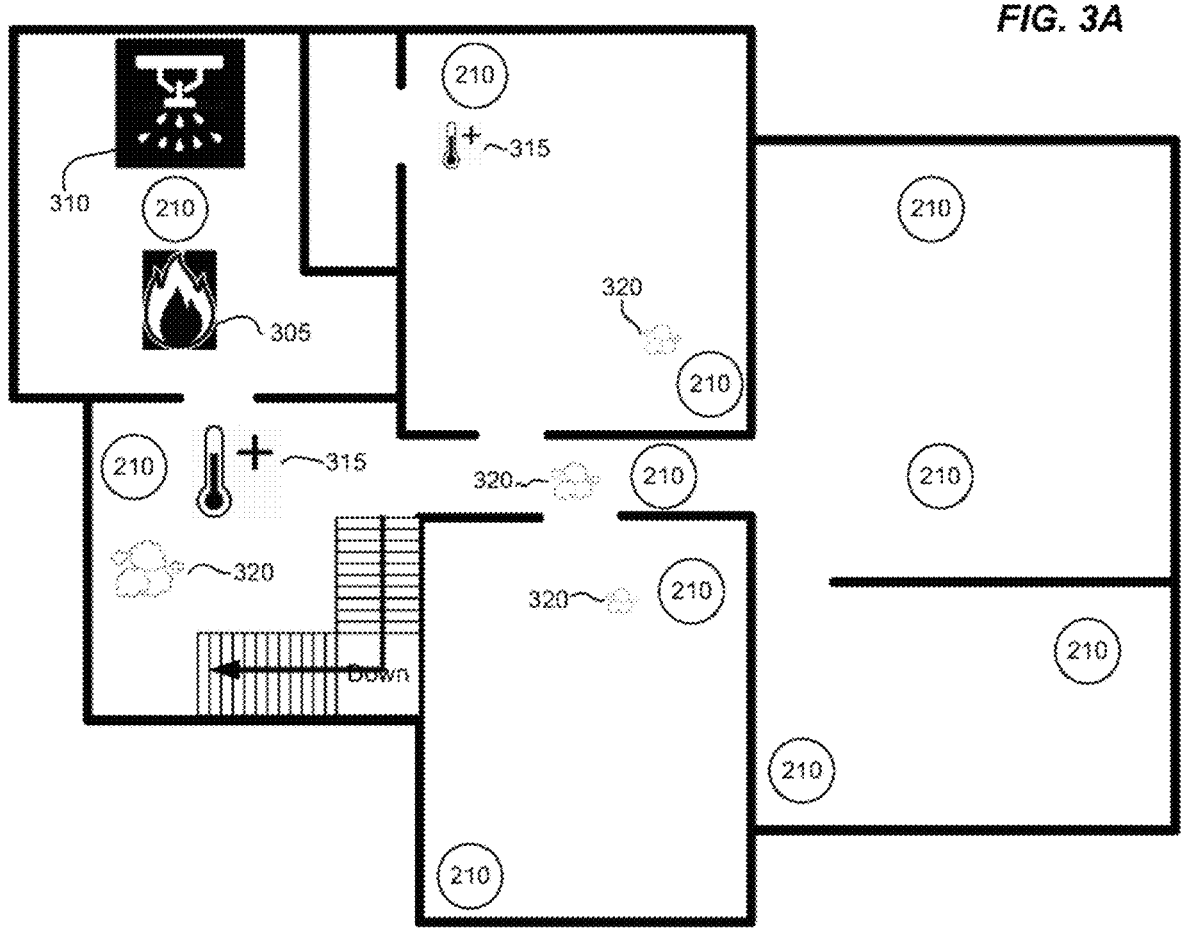
FIGS. 3A and 3B illustrate real-time event maps in accordance with aspects of the present disclosure.
Figure 3B:
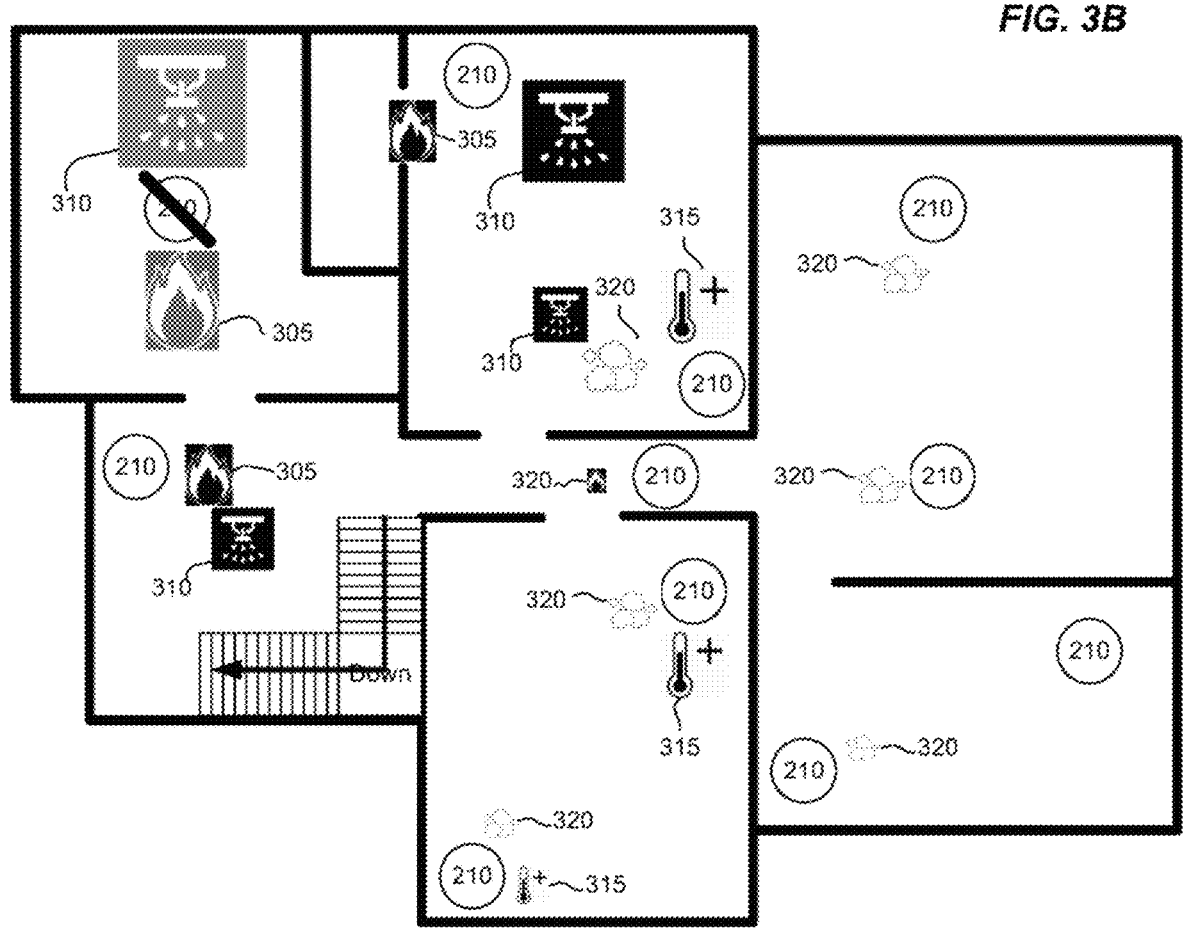

FIGS. 3A and 3B illustrate a real-time map according to an example embodiment. Referring to FIG. 3A, there is provided a layout of a floor including sensor locations. The condition statuses sensed by the various sensors are presented. For example, a first smart sensor 210 detected a fire and extinguisher in its room. These may be represented by, for example, icons 305 and 310, respectively. A second sensor 210 in an adjacent room detects elevated temperatures and smoke. These conditions are represented by icons 315 and 320, respectively. Similarly, sensors 210 located farther from the fire may detect smoke by no elevated temperature, while a sensor 210 in an adjacent room without a passage may detect elevated temperatures by no smoke. A value or intensity of the detection may be communicated by, for example, a size of the respective icons, a color of the icons, or through some other indicator.

The real-time map may be updated as matters change. For example, in FIG. 3B, the fire has spread, and smoke, heat, fire, and sprinklers are now detected in by additional sensors. Additionally, the fire has damaged the sensor in the first room, and is no longer providing sensor data. Therefore, a most recent known status is shown faded out. The real-time map updates may be saved and the event (e.g., spreading of a fire) may be replayed later for investigative purposes.

In certain implementations, LMS 220 may poll smart sensors 210 for a condition status regularly (e.g., through a two-way data connection). For example, if a smart sensor 210 has not submitted a condition status within a predetermined period of time, LMS 220 may initialize communication with the smart sensor 210. If no response is given (or the response is erroneous or otherwise unintelligible), LMS 220 may output an alert indicating that sensor maintenance is needed.

Figure 4:
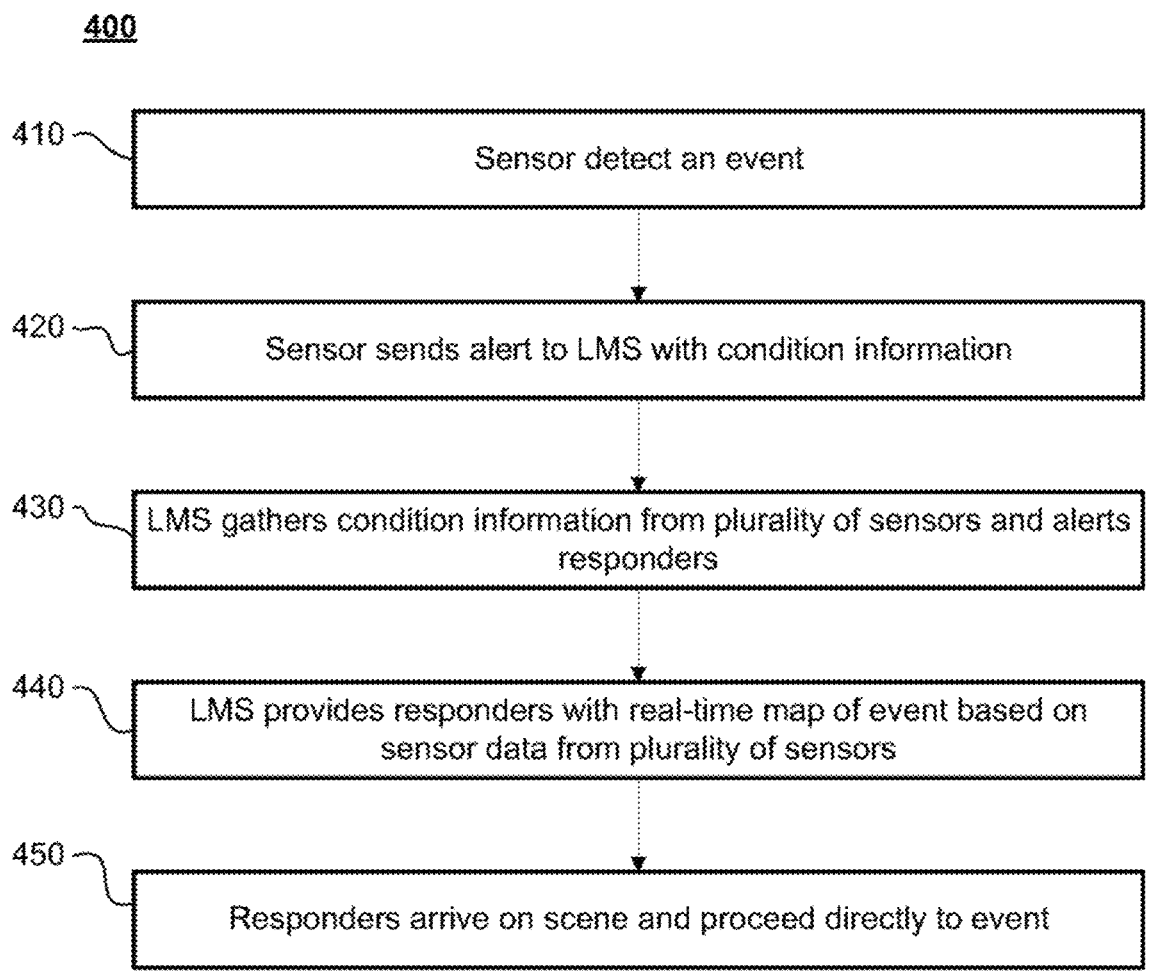
FIG. 4 is a flow diagram of an emergency alert flow a monitoring system in accordance with aspects of the present disclosure.

FIG. 4 is a flow diagram 400 of an emergency alert flow of a monitoring system in according to an example embodiment. In FIG. 4, a plurality of smart sensors 210 are distributed across a building. Each sensor 210 is connected to the LMS 220. When a sensor 210 detects 410 an event (e.g., smoke), it sends 420 a signal to the LMS 220 along with condition information. LMS 220 gathers 430 condition information from a plurality of sensors 220 and alerts responders. Before responders arrive, LMS provides 440 a real-time map of the event based on sensor data from the sensors 220. Thus, when responders arrive on scene, they proceed 450 directly to the event location and address the event.

Figure 5:
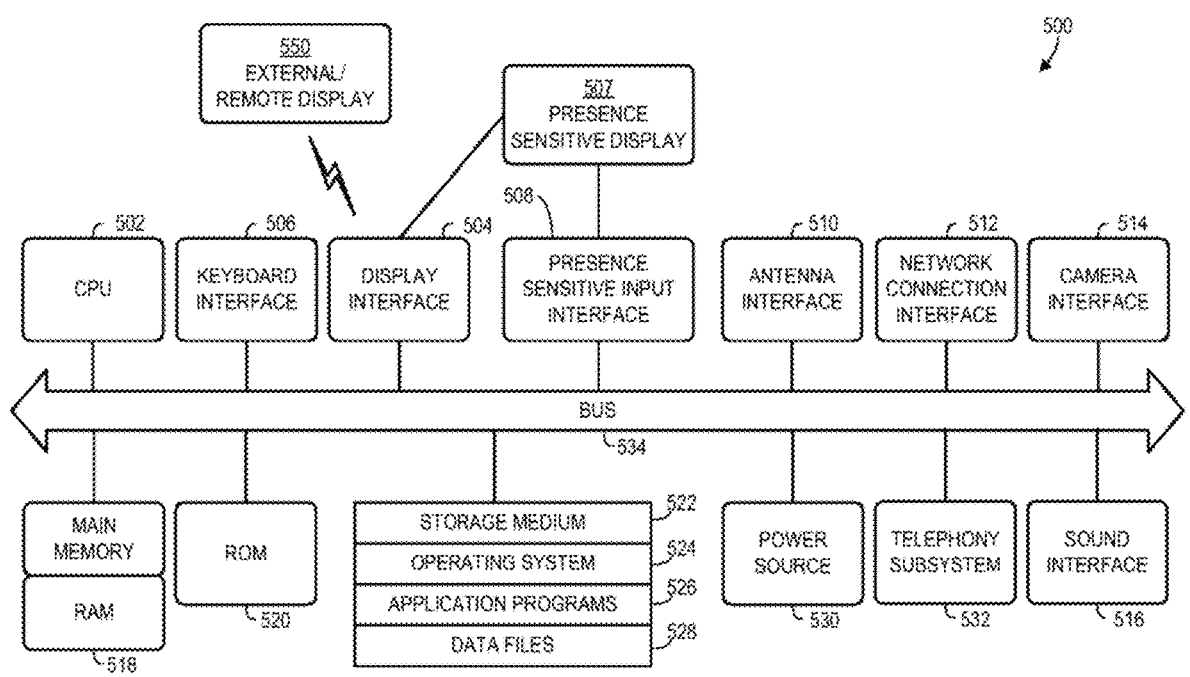
FIG. 5 is a block diagram of an illustrative computer system architecture according to an example embodiment.

FIG. 5 is a block diagram of an illustrative computer system architecture 500, according to an example implementation. As non-limiting examples, aspects of smart sensors 210 and/or LMS 220 may be implemented using one or more elements from the computer system architecture 500. It will be understood that the computing device architecture 500 is provided for example purposes only and does not limit the scope of the various implementations of the present disclosed systems, methods, and computer-readable mediums.

The computing device architecture 500 of FIG. 5 includes a central processing unit (CPU) 502, where computer instructions are processed, and a display interface 504 that acts as a communication interface and provides functions for rendering video, graphics, images, and texts on the display.

In certain example implementations of the disclosed technology, the display interface 504 may be directly connected to a local display, such as a touch-screen display associated with a mobile computing device. In another example implementation, the display interface 504 may be configured for providing data, images, and other information for an external/remote display 550 that is not necessarily physically connected to the mobile computing device. For example, a desktop monitor may be used for mirroring graphics and other information that is presented on a mobile computing device. In certain example implementations, the display interface 504 may wirelessly communicate, for example, via a Wi-Fi channel or other available network connection interface 512 to the external/remote display 550.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display 550 that is not necessarily connected to the mobile computing device. In one example, a desktop monitor may be used for mirroring or extending graphical information that may be presented on a mobile device. In another example, the display interface 504 may wirelessly communicate, for example, via the network connection interface 512, such as a Wi-Fi transceiver to the external/remote display 550.

The computing device architecture 500 may include a keyboard interface 506 that provides a communication interface to a keyboard. In one example implementation, the computing device architecture 500 may include a presence-sensitive display interface 508 for connecting to a presence-sensitive display 507. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence-sensitive display interface 508, network connection interface 512, camera interface 514, sound interface 516, etc.) to allow a user to capture information into the computing device architecture 500. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna, a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components.

According to an example implementation, the computing device architecture 500 includes a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 to execute software programs. Data may be stored in the RAM 518, where the data may be accessed by the computer CPU 502 during execution.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro- DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may include a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation. This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An emergency sensor system comprising:
a plurality of environmental sensors; and
a local monitoring station (LMS) connected to each of the plurality of environmental sensors, the LMS comprising a transceiver, a processor, and a memory having stored thereon instructions that, when executed by the processor, control the processor to execute a method comprising:
receiving, from at least one environmental sensor of the plurality of environmental sensors, sensor data indicative of an environmental state proximate the at least one environmental sensor, wherein the at least one environmental sensor detects fire, smoke, carbon monoxide, motion, temperature, carbon dioxide, light or humidity,
analyzing the sensor data,
generating a 3-D real-time event map, and
transmitting the 3-D real-time event map to a remote device,
wherein the plurality of environmental sensors are configured to (i) automate location information by wirelessly communicating relative positions of the environmental sensors to estimate respective locations of the environmental sensors, and (ii) estimate respective relative locations of the environmental sensors based on directions and signal strengths of other wireless directional signals from at least one other environmental sensor of the plurality of environmental sensors.

2. The emergency sensor system of claim 1, wherein the sensor data further comprises location information of the at least one environmental sensor.

3. The emergency sensor system of claim 1, wherein the plurality of environmental sensors are installed in a building, and wherein the instructions, when executed by the processor, further control the processor to generate a real-time event map comprising a plurality of floorplans of the building with environmental states at locations corresponding to locations of the at least one environmental sensor.

4. The emergency sensor system of claim 3, wherein the locations of the at least one environmental sensor is determined based on directional signals and signal strength of at least a second environmental sensor of the plurality of environmental sensors.

5. The emergency sensor system of claim 3, wherein each of the plurality of floorplans are a representation of a floor of the building, and wherein each of the plurality of floorplans are overlayed with environmental states at locations corresponding to locations of the at least one environmental sensor.

6. The emergency sensor system of claim 3, wherein the environmental states are overlayed on the plurality of floorplan of the building as icons indicating a fire, elevated temperatures, smoke, heat, water, or combinations thereof, wherein a size or color of each of the icons indicate an intensity of the environmental state.

7. The emergency sensor system of claim 1, wherein
one or more of the plurality of environmental sensors comprise a respective camera, and
the real-time event map comprises one or more images captured by one or more respective cameras of the at least one environmental sensor.

8. The emergency sensor system of claim 1, wherein one or more of the plurality of environmental sensors comprise a respective camera activatable by a signal from the LMS.

9. The emergency sensor system of claim 8, wherein the instructions, when executed by the processor, further control the processor to activate one or more respective cameras of the at least one environmental sensor in response to determining, based on the sensor data, that an emergency situation is occurring.

10. The emergency sensor system of claim 9, wherein the respective camera activatable by the signal from the LMS captures images of an area near the emergency situation on the real-time event map and wherein the images of the area are analyzed to determine if the emergency situation is a false alarm.

11. The emergency sensor system of claim 8, wherein the cameras are only activatable by a signal from the LMS.

12. The emergency sensor system of claim 1, wherein the sensor data indicates at least one from among a temperature, a fire intensity, and a parts-per-million of smoke-particles.

13. The emergency sensor system of claim 12, wherein the plurality of environmental sensors are further configured to output wireless directional signals and estimate respective locations of the plurality of environmental sensors based on a direction and signal strength of the outputted wireless directional signals.

14. An emergency sensor system comprising:
- a plurality of smart sensors installable at positions about a building, each of the plurality of smart sensors comprising:
  - an environmental sensor configured to monitor one or more local conditions, wherein the at least one environmental sensor detects fire, smoke, carbon monoxide, motion, temperature, carbon dioxide, light or humidity; and
  - a transceiver,
- wherein the plurality of smart sensors comprise one or more edge sensors and one or more central sensors,
- wherein the central sensors are configured to transmit, using the transceiver, sensor data to one or more of the one or more edge sensors,
- wherein the emergency sensor system is configured to generate a 3-D real-time event map, wherein the 3-D real-time event map includes using the sensor data from the one or more edge sensors and transmit the 3-D real-time event map to a remote monitoring station (RMS),
- wherein the plurality of smart sensors are configured to automate location information by wirelessly communicating relative positions of the smart sensors to estimate respective locations of the smart sensors.

15. The emergency sensor system of claim 14, wherein the plurality of smart sensors are configured to form a mesh network and transmit sensor data to the edge sensors over the mesh network.

16. The emergency sensor system of claim 14, wherein the sensor data further comprises location information of the respective smart sensor.

17. The emergency sensor system of claim 16, wherein the RMS is configured to generate a real-time event map based on the local conditions and the location information.

* * * * *